United States Patent
Lozac'h et al.

(10) Patent No.: US 11,728,967 B2
(45) Date of Patent: Aug. 15, 2023

(54) DYNAMIC MASKING

(71) Applicant: SECURE-IC SAS, Cesson-Sevigne (FR)

(72) Inventors: Florent Lozac'h, Trappes-en-Yvelines (FR); Sylvain Guilley, Paris (FR)

(73) Assignee: SECURE-IC SAS, Cesson-Sevigne (FR)

( * ) Notice: Subject to any disclaimer, the term of this patent is extended or adjusted under 35 U.S.C. 154(b) by 133 days.

(21) Appl. No.: 16/772,723

(22) PCT Filed: Dec. 11, 2018

(86) PCT No.: PCT/EP2018/084351
§ 371 (c)(1),
(2) Date: Jun. 12, 2020

(87) PCT Pub. No.: WO2019/115520
PCT Pub. Date: Jun. 20, 2019

(65) Prior Publication Data
US 2020/0322127 A1      Oct. 8, 2020

(30) Foreign Application Priority Data
Dec. 15, 2017   (EP) ...................... 17306790

(51) Int. Cl.
*H04L 9/06*     (2006.01)
*H04L 9/32*     (2006.01)

(52) U.S. Cl.
CPC .......... *H04L 9/0618* (2013.01); *H04L 9/3278* (2013.01)

(58) Field of Classification Search
CPC ............. H04L 2209/04; H04L 2209/12; H04L 9/3278; H04L 9/0618
See application file for complete search history.

(56) References Cited

U.S. PATENT DOCUMENTS

2007/0140478 A1*  6/2007  Komano .............. H04L 9/0618
                                                  380/28
2010/0239091 A1   9/2010  Amiel et al.
(Continued)

FOREIGN PATENT DOCUMENTS

| EP | 0 981 223 A2 | 2/2000 |
| EP | 2 526 505 A1 | 11/2012 |
| NO | 2011/089143 A1 | 7/2011 |

OTHER PUBLICATIONS

Alexander DeTrano et al., Exploiting Small Leakages in Masks to Turn a Second-Order Attack into a First-Order Attack and Improved Rotating Substitution Box Masking with Linear Code Cosets , 2015, Hindawi Publishing Corporation The Scientific World Journal, vol. 2015, Article D, pp. 1-11 (Year: 2015).*
Claude Carlet et al., Side-Channel Indistinguishability, 2013, ACM, pp. 1-8 (Year: 2013).*
Claude Carlet et al., Leakage squeezing: Optimal implementation and security evaluation, 2014, De Gruyter, pp. 1-47 (Year: 2014).*
Xuan Thuy Ngo et al., Against Hardware Trojan Horses, 2015, IEEE, pp. 1-6 (Year: 2015).*
(Continued)

*Primary Examiner* — Ellen Tran
(74) *Attorney, Agent, or Firm* — BakerHostetler (57) ABSTRACT

A circuit includes a cipher accessing a plurality of read-write memory units configured to handle data tables obtained from a modified mask; wherein the modified mask is being determined from an initial mask and a random value, the random value selecting one or more modifications of the initial mask amongst a plurality of predefined modifications including permutation operations. Developments of the invention describe the use of mathematically optimal or equivalent masks; the use of random values; a range of permutation operations comprising offset shifting and/or rotation and/or XOR operations and/or coprime construction; the use of round masks; the use of a Physically Unclonable Function; the refresh or update of modified masks and/or round masks; and verifications of the optimality and/or integrity of masks. System features (e.g. CPU, co-processor, local and/or remotely accessed external (Continued)

memory storing masks, volatile memory) and computer program products are described.

16 Claims, 6 Drawing Sheets

(56) References Cited

U.S. PATENT DOCUMENTS

| | | | |
|---|---|---|---|
| 2012/0072737 A1* | 3/2012 | Schrijen | H04L 9/3278 |
| | | | 713/189 |
| 2013/0077790 A1* | 3/2013 | Kawabata | H04L 9/0631 |
| | | | 380/28 |
| 2017/0063522 A1* | 3/2017 | Bruneau | H04L 9/0631 |

OTHER PUBLICATIONS

Claude Carlet and Sylvain Guilley, Statistical properties of side-channel and fault injection attacks using coding theory, 2017 Springer pp. 1-25 (Year: 2017).*

Nassar, "Low-cost countermeasures against physical attacks on cryptographic algorithms implemented on altera FPGAs", Telecome ParisTech, Thesis, Mar. 9, 2012.

Nassar, "Low-cost countermeasures against physical attacks on cryptographic algorithms implemented on altera FPGAs", Mar. 9, 2012.

Nassar, et al., "RSM: a Small and Fast Countermeasure for AES, Secure against 1st and 2nd-order Zero-Offset SCAs", Design Automation and Test in Europe, Dresden, Germany, pp. 1173-1178, Mar. 2012.

* cited by examiner

DYNAMIC MASKING

CROSS-REFERENCE TO RELATED APPLICATIONS

This application is a National Stage of International patent application PCT/EP2018/084351, filed on Dec. 11, 2018, which claims priority to foreign European patent application No. EP 17306790.1, filed on Dec. 15, 2017, the disclosures of which are incorporated by reference in their entirety.

TECHNICAL FIELD

This invention generally relates to the field of digital data processing and more particularly to the field of computer security.

BACKGROUND

In some existing cryptographic systems, data stored in a RAM (Random Access Memory) can be encrypted on-the-fly (by a cipher block) using a mechanism of "in-line processor RAM encryption". Even if the content of the memory is intercepted or otherwise read, the content is considered to be protected because it is encrypted. Such approach has vulnerability in that the cipher block can be attacked, for example to get the encryption key (by cryptoanalysis, side channel attacks, fault injection attack, etc).

Different types of countermeasures have been proposed to protect a cipher block. For example, masking techniques can be used. A masking technique consists in applying a mask to the data that are to be protected, the data being unmasked at the very end of the processing. Masking/ciphering operations (also called "rounds") can use pre-computed tables of values.

Hardware cipher blocks generally access cipher memory units storing such tables of values. In existing systems, these tables of values are generally burnt in read-only memory units (ROM) units. Cipher hardware blocks access pre-computed tables of values stored in ROM macro-cells. In particular, for security reasons, IP blocks' designers often use "macro-cells" which are "predesigned" ROM (Read Only Memory), optimized for low leakage (glitches) and high density.

However, in such conventional approaches, chips are irreversibly burnt with predefined values ("customization"). Customization diversity is limited due to (necessary) mass production. Customization is required to be made offline, i.e. at the development stage. Flaws are associated with product lines. Since ROM units contain by definition static data, the layout of memory units can be analyzed by imaging techniques to retrieve the content (physical states of memory units). Consequently, as the content of ROM units may be determined, the associated security level is significantly lowered and further attacks can be performed. If one sample of a series in a production is compromised, all product line is compromised.

There is accordingly a need for methods and systems for improved management of cipher blocks masks.

SUMMARY

In order to address these and other problems, there is provided a circuit comprising a cipher accessing a plurality of read-write memory units configured to handle data tables obtained from a modified mask. The modified mask is determined from an initial mask and a random value, the random value selecting one or more modifications of the initial mask amongst a plurality of predefined modifications including permutation operations.

Embodiments of the invention may use mathematically optimal or equivalent masks, random values, a range of permutation operations comprising offset shifting and/or rotation and/or XOR operations and/or coprime construction, round masks, a Physically Unclonable Function (PUF), refresh or update of modified masks and/or of round masks, and/or verifications of the optimality and/or integrity of masks. Some embodiments provide system features (e.g. CPU, co-processor, local and/or remotely accessed external memory storing masks, volatile memory) and/or computer program products.

Some embodiments may use RAMs and/or ROMs instead of exclusively ROMs. Embodiments of the invention provide improved mass production (economies of scale) and possibilities of online (even adaptive) customization associated with reprogrammable memory contents.

In some embodiments, the use of volatile memory units and the use of masking techniques may be combined, thereby allowing additional robustness to "side channel-attacks". In cryptography systems, a side-channel attack refers to any attack based on information gained from the physical implementation of a cryptosystem, rather than brute force or theoretical weaknesses in the algorithms. For example, timing information, power consumption, electromagnetic leaks or even sound can provide an extra source of information, which can be exploited to break the system. By masking the intermediate values inside a cryptographic algorithm, the leakage of information still exists, but is randomized. Thus, the number of "traces" needed for a classic attack becomes unrealistic. For example, masking ensures that every single variable is masked with at least one random value so that a classical (first-order) differential power analysis (DPA) attack cannot be successfully carried out anymore. Although a hardware cipher (i.e. in ROM, a part of the silicon area which has been "burnt" to carry out this ciphering function) may usually be faster than a software cipher, a "software" cipher (e.g. in RAM) is usually less prone to imaging analysis than a hardware cipher (value of data is not in a physical state, but in an electrical state, so less visible).

Some embodiments of the invention enable to dynamically customize masking countermeasures. In other words, customization of ciphers can be dynamic. In some embodiments, customization can be made after product deployment. In some embodiments, customization is flexible and can be configured over time, reusing circuits. In some embodiments, customization can be made for each chip sample. Customization of masks can be determined by a diversity of security policies. Customization of masks can be performed rapidly and easily.

Advantageously, values of memory units can be hardly retrieved by imaging techniques (as memory units comprise volatile memory). Further, reading out volatile memory units significantly raises attack quotation.

In one embodiment, ciphers can remain not functional until valid data has been provided.

In another embodiment, ciphers can remain not functional until memory units are not filled in by valid data.

In still another embodiment, ciphers can be integrated with AES with no significant hardware changes.

Advantageously, embodiments of the invention protect processors belonging to a same production line and attack quotation stay unchanged for other chips. In contrast, in conventional protection systems, in case one chip is compromised, all chips are compromised, while attack quotation is significantly lowered for others chips.

Further, embodiments of the invention can apply to one or more cores of a multicore or manycore processor.

BRIEF DESCRIPTION OF DRAWINGS

Embodiments of the present invention will now be described by way of example with reference to the accompanying drawings in which like references denote similar elements, and in which.

DETAILED DESCRIPTION

Embodiments of the invention provide a system (also referred to as a "ciphering" system) comprising a cipher block, the cipher block being configured to access one or more memory units. In some embodiments, at least one memory unit is volatile. The cipher block is configured to handle masked program data such as for example to handle masked tables of values needed by a cipher algorithm.

As used herein, the term "cipher" (or cypher) designates an algorithm or sequence of steps for performing encryption or decryption. As used herein, the terms "encipher" or "encode" refer to a conversion of information into cipher or code. In an encryption scheme, the intended communication information or message, referred to as plaintext, is encrypted using an encryption algorithm or "cipher" or "cipher block" when referring to hardware embodiment or "cipher function" when referring to software embodiment. The text generated by the cipher is the cipher text that can only be read in clear once decrypted.

A "hardware" cipher (i.e. silicon area which has been "burnt" to carry out this ciphering function) is faster than a "software" cipher (executed in memory). However, a "software" cipher is less prone to imaging analysis than a "hardware" cipher (the value of data is not in a physical state, but in a less visible electrical state). Hardware ciphers are generally more efficient and secure than software implementations.

As used herein, the term "program" designates a sequence of steps, i.e. an "algorithm". A program can be executable, e.g. by a machine such as a processor.

Memory units can be "read-write" (in general), and memory units can be "volatile" memory units (in particular). As memory units are "volatile" and/or "read-write", stored content can be (possibly dynamically) scrambled (or reorganized or rearranged) to make analysis more difficult.

As used herein, the term "read-only memory" (ROM) designates a circuit design whereon data content cannot be updated after manufacturing. ROM units may be attacked by imaging techniques (performed offline or online), because value of data is a physical state, i.e. in a specific physical state for '1' and in another for '0'.

Some embodiments of the invention can use read-write memory units. Advantageously, "read-write" memory units allow rewriting in the memory after manufacturing.

The term "random-access memory" (RAM) or "read-write memory" (RWM) correspond to forms of volatile computer data storage. A random-access memory device allows data items to be accessed (read or written) in almost the same amount of time irrespective of the physical location of data inside the memory. "Random access" means it does not take much longer to get a data because it is at the beginning or at the end of the memory. Advantageously, RAM units are less prone to imaging techniques (data is not a physical state, but in an electrical state which is less visible).

Some embodiments of the invention can use volatile memory. Using a volatile memory is advantageous in the context of the invention because reading a RAM by imaging techniques is generally difficult, (i.e. requires dynamic probing to determine electrical states and not physical states of bits in memory cells). Imaging is generally carried out when the system is "online" i.e. when the chip is powered on and running/functional. With a volatile memory, data is generally lost when the memory is not powered-up. Non-Volatile RAMs exist (F-RAM, MRAM). With volatile memory units, after chip power-up, the block cipher cannot work until consistent data has been stored.

A memory unit or block according to the invention can be "volatile" or "non-volatile". In a "volatile memory", contrary to a "non-volatile" memory, power is required to maintain the stored information. A volatile memory retains its contents while powered on but when the power is interrupted the stored data is lost very rapidly or immediately. Advantageously, encryption tables of values cannot be analyzed when the chip is offline. When it is online, some imaging techniques may be used to recover the data but are significantly more complex (and time consuming in particular, said delay be leveraged to enhance security). Although RAM units are usually "volatile" memory, Non-Volatile RAMs (NVRAMs) exist (for example "flash memory" is a non-volatile RAM). Embodiments of the invention can use NVRAMs. In such a case, the data are not lost so that the cipher blocks can be working (or "operating") right after start-up.

In some embodiments, memory units can comprise a combination of volatile and non-volatile memory. For example, memory units can combine RAM (flexibility) and ROM (mass production, cost factor and speed). The technology can be one or more of a register, a cache, a ROM/RAM, a flash drive memory, or hard drive. Associated access speed can be different, but RAM or ROM memory units can be accessed within one clock cycle.

Embodiments of the invention can use various technologies of memory units or blocks. Volatile memory according the invention can be one or more of DRAM (e.g. DDR SDRAM), SRAM, T-RAM, Z-RAM. Dynamic random-access memory (DRAM) is a type of random-access memory that stores each bit of data in a separate capacitor within an integrated circuit. Because of a refresh requirement of the capacitor charge, it is a dynamic memory as opposed to static random-access memory (SRAM). Double data rate synchronous dynamic random-access memory (DDR SDRAM) is widely used in computers. Static random-access memory (static RAM or SRAM) is type of semiconductor memory that uses bi-stable latching circuitry (flip-flop) to store each bit. SRAM exhibits data remanence. SRAM is volatile in that data is eventually lost when the memory is not powered. Thyristor RAM (T-RAM) uses negative differential resistance (thin capacitively-coupled thyristor). Corresponding memory cells are capable of very high packing densities. Zero-capacitor (Z-RAM) is a dynamic random-access memory technology based on the floating body effect of silicon on insulator (SOI) process technology. Other types of RAM suitable for embodiments of the invention include but are not limited to 1T-SRAM, A-RAM, Diode memory, EDRAM, Ferroelectric RAM, FJG RAM, Magnetic-core memory, Magneto resistive random-access memory, Nano-RAM, Non-volatile random-access memory, NvSRAM, Phase-change memory, Resistive random-access memory, Static random-access memory, T-RAM, Video RAM (dual-ported DRAM), Williams tube, Z-RAM.

There can be $2^n$ (also noted 2^n) memory units, with $n \geq 4$ (e.g. 16 or 32 or 256 memory units). The number of memory units may depend on the algorithm implemented by the cipher block.

Memory units and cipher blocks can be arranged in different ways. Memory units and/or cipher blocks can be distributed in space.

In an embodiment, memory units may be "dedicated" to the cipher (e.g. dedicated addresses, partitions etc).

In an embodiment, memory units may be "exclusively accessible" to/by the cipher.

In an embodiment, volatile memory units may be accessible and/or accessed only by the cipher. In an embodiment, the dedication or exclusivity may be implemented in hardware. For example, memory units may be physically located in/within/on the cipher (physical access, beyond logical access). In an embodiment, memory units can be located remote from the cipher, but logical access can be configured to preserve exclusive access (access control rights, encryption keys, authentication, etc).

In some embodiments, the memory units (e.g. "read-write" memory units) may be dedicated to cipher blocks. For example, they can have direct connections.

In some embodiments, a memory unit may be part of a cipher block. In some embodiments, each memory unit may be part of each respective cipher block. A memory is part of the cipher system in that it is used as an operator (its address represents input data and its content is a truth table of the operation). For example, for symmetric cryptography, Substitution Box (S-box) is generally implemented in memory tables. The physical connections may be direct wires or shared wires (e.g. bus).

The memory units may be configured to store program data. Memory units may store program or (ciphering) algorithm data, such data being necessary for the cipher.

In a particular embodiment, a Rotating Substitution Box (hereinafter "RSM") masking method may be used. In such a method, there is operated a non-linear function on bytes (e.g. substitution). In substance, the underlying principle of RSM is that each variable is masked and that the table implementing the S-Box contains an unmasking step at the S-Box input and a re-masking step at the S-Box output. The input and output mask are such that the output mask of S-Box "I" is the input mask of S-Box "i+1" at the next round of the algorithm, therefore representing a rotation function.

In some embodiments, program data can be raw data, i.e. bytes.

In some embodiments, beyond raw data (suitable for processing by cipher blocks), program data more generally can be "executable instructions" (suitable for processing by external processors and/or other programs). In computer science, programs are themselves a form of data which can be manipulated by other programs. In such embodiments, where program data are executable instructions, a given circuit can get customized, by/upon configuring the order of execution of instructions. Said order for example can be predefined and invariant. Alternatively, the order can be dependent on external factors and/or triggers (for example at boot, on demand/request, on event (for example if a threat is detected) or periodically).

The memory units according to the invention may comprise encryption and/or masking program data (e.g. sequence of steps or "algorithm") associated with the cipher block, or parts thereof. For example, the cipher program can use masked substitution boxes ("S-boxes"), i.e. more generally masked data (e.g. constant data). Parts of the S-box algorithm may be temporarily stored in the memory units (a contrario the volatile memory units do not comprise plaintexts or ciphertexts, i.e. input or output data of the cipher block).

Program data can thus be or comprise executable instructions (a plurality thereof, ordered instructions, a sequence of instructions).

As used herein, a "mask" designates systems and methods used to hide initial data.

Data masking or data obfuscation is the process of hiding original data with random characters or data. Data masking techniques comprise one or more of operations comprising substitution, shuffling, number and date variance, encryption, nulling out or deletion, masking out, using complex rules. Different types of data masking may be available, such as static data masking, on-the-fly data masking, dynamic data masking, online Data Masking, etc. Advantageously, masking allows hiding or preventing data leaking (side channels attacks).

In some embodiments of the invention, the contents of memory units can be further "obfuscated" or "complexified" or "protected" by the application of a mask.

When masking techniques are used in encryption mechanisms, a mask may be generally used at the beginning of the ciphering process (as a first operation). Then, other operations may be performed on a masked data. Unmasking is done after the last ciphering operation. Some masking techniques require that the ciphering units are modified to make operations on masking data to be possible. For example, this is the case with AES RSM. In an AES RSM application, masking needs S-boxed content to be modified and memories to be addressed in specific manner.

A mask may be constant or a mask may be dynamic, i.e. change over time.

To determine a mask, a random value may be taken as an input. A mask usually fulfills certain mathematical requirements.

A specific embodiment of the invention may use the mask of Rotating S-Box, for example as defined in the article entitled "RSM: a Small and Fast Countermeasure for AES, Secure against 1st and 2nd-order Zero-Offset SCAs" in Design Automation and Test in Europe, March 2012, Dresden, Germany. Pp. 1173-1178, 2012, by Nassar et al.

A mask can be determined in hardware and/or in software.

In some embodiments, the cipher block can be replaced by a hardware block implementing an algorithm (sequence of steps), which can be any type of algorithm (not necessarily a ciphering or masking algorithm). For example, in an embodiment, the hardware block can be a checksum generator (implement a hash function) and dedicated memory unit(s) can temporarily store parts of the corresponding algorithm (ordered steps), along with dynamic rearrangements described hereinafter.

The rearrangement of the content of the memory units may be performed in various ways (possibly combined one with another). Scrambled data can be masked data, hided data, encrypted date (e.g. using homomorphic encryption), and the like.

Embodiments of the invention use at least one cipher block, i.e. a portion of silicon embodying an encryption and/or ciphering algorithm. In combination to the use of volatile memory, the cipher block is configured to handle or manipulate masked data, i.e. data after application of a mask. The cipher block is thus a modified or specific circuit according to the invention. A template base mask may be chosen by an operator, based on particular mathematical properties. An initial base mask may be then determined by the input of a random value. This initial base mask may be used to generate N masks, which are used in the corresponding memory units.

The correspondence between masks and memory units can be "one to many", "many to many" and/or "one to one".

In an embodiment, there is disclosed a circuit comprising a cipher block, the cipher block being configured to access a plurality of memory units. The cipher block may be configured to handle data tables. The memory units may be configured to store the data tables. The memory units may be read-write memory units. The data tables may be obtained from a modified mask, the modified mask being determined from an initial mask and a random value. The random value is used to select a modification of the initial mask amongst a plurality of predefined modifications including permutation operations.

The expression "a cipher block", although designated at the singular, can correspond (physically) to a plurality of cipher circuits. Likewise, the term "a memory unit" can designate a plurality of memory units.

The "initial" (or "input") mask is modified (e.g. changed or customized or updated or transformed or converted) into a modified (or "custom" or "derived" or "output") mask.

A mask is a codeword. In cryptography, a "code word" or "codeword" or "code-word" designates a string representing an encoded piece of text. In communication, a code word or codeword or code-word is an element of a standardized code or protocol. Each code word can be assembled in accordance with specific rules of a code and be assigned a unique meaning. Code words are typically used for reasons of reliability, clarity, brevity, or secrecy. Concretely, a codeword comprises bits. A bit is a basic unit of information with only one of two values (0 or 1). Modifications brought to the mask comprise binary operations performed (on bits) on the initial mask. Modifications brought to the initial mask can be constrained.

The modified or customized mask is used by one or more software of hardware procedure to compute data tables which in turn can be stored in the memory unit(s).

In an embodiment, the initial mask may be a mathematically optimal mask. In some advantageous embodiments, the initial (or input) mask may be a mathematically optimal mask. An optimal mask may be selected among a code C and its dual D, where C is a constant hamming weight code and wherein D is a code with a large dual distance.

In an embodiment, the modified mask may be an equivalent codeword of the initial mask. The "custom" (or "modified" or "output" mask) is an equivalent code of the code C.

In an embodiment, predefined modifications or permutation operations may comprise offset shifting and/or rotation and/or XOR operations.

Rotation is a type of permutation. For example, the output mask can advantageously consist in the result of the input mask being shifted by a nonzero offset coprime with code cardinality. For example, for an AES cipher, C can optimally be a code [8,4,4] (with a length of 8, since AES manipulate bytes of size=$2^4$=16, since there are 16 bytes in the AES state and the maximum (dual) distance is 4). Such an exemplary code is self-dual, hence the minimum distance 4 is also the dual distance of the code. The shift for the output mask can be nonzero and coprime with 16, i.e. any shift by an odd number is suitable.

In an embodiment, the modified mask determined from the initial mask may be further modified into a round mask.

In an embodiment, a round mask may be determined from permutation operations comprising rotation and/or coprime construction.

In number theory, two integers are said to be relatively prime, mutually prime, or coprime if the only positive integer that divides both of them is 1.

In an embodiment, Rotating S-box can be used. In masking countermeasures such as RSM (Rotating S-box), a mask is statically selected (base mask) and many variations of it are dynamically selected (by a seed, i.e. with a very small random data e.g. a few bits). The Rijndael S-box is a matrix (square array of numbers) used in the Rijndael cipher, which the Advanced Encryption Standard (AES) cryptographic algorithm was based on. The S-box (substitution box) serves as a lookup table. RSM uses the same number of S-Boxes as an unprotected implementation for the entire computation of the AES algorithm. But unlike any previous masking scheme, all those S-Boxes are different. They all contain a mechanism to unmask the input data, perform the basic $S(x)$, where x is an 8-bit unmasked data, and re-mask it with another constant.

In an embodiment, the random value may be provided by a Random Number Generator circuit. In some embodiments, the RNG can be a pseudo-random number generator (PRNG). Modifications performed on the initial mask can comprise binary operations, whose number, order and used constants can be determined by a random value or random data.

In an embodiment, the Random Number Generator circuit is a True Random Number Generator (True RNG) circuit. In some embodiments, the RNG circuit may be a True RNG (for example, the TRNG can be a Quantum Random Number Generator or QRNG).

In an embodiment, the random value may be provided by a Physically Unclonable Function (PUF). In some particular situations, a physically unclonable function can advantageously be used to provide random data used to modify the initial mask into a modified or custom mask.

A PUF is usually a physical function (not a mathematical function) which maps a digital "challenge" to a digital "response" (i.e. a "Challenge and Response Pair", acronym CRP). A challenge is a vector of bits. Running a PUF with a set of challenges produces a unique and non-predictable set of responses. A PUF yields a deterministic answer for the same challenge. A PUF takes advantage of the variance of conditions in the manufacturing process of many devices (identical at the macro level). To some extent, a PUF may be considered as the analog of a fingerprint of the device. Advantageously, since all manufactured circuits according to the invention are unique (due to manufacturing irreducible differences), the manufacturer of the circuits can "know" the random data associated with each circuit (PUF enrollment, at profiling phase). If and when the initial mask is known, the manufacturer may then be able to bypass the countermeasure. Such an embodiment can be advantageous in some situations, where some forms of downstream control are still required.

In some embodiments, a PRNG can be combined with a Physically Unclonable Function (PUF). In an embodiment, the CPU can determine a mask, for example from a value stemming from a PUF. A PUF signature can directly be the mask, or correspond to the mask. A Random Number Generator (PRNG) can then be used to add entropy to the PUF signature. A PRNG can also be used to generate seeds for countermeasures, if required. For example, a RSM masking can require a seed. A given base mask can produce or lead to N variations. The seed for example can select a variation at each ciphering operation. In some embodiments, no seeds are required: a mask (and derived memory contents) may be generated for each ciphering operation.

While a RNG will always provide a new mask, a PUF will provide always the same mask. In some embodiments, a mask can be public or revealed (or published): known attacks on masking countermeasures (such as RSM) require the mask to be known. In some embodiments, a mask is secret (is not known): attacks are much more difficult. PUF advantageously can be used to generate an intrinsic signature of the circuit. In practice, the integration of a PUF advantageously can use an offline configuration (enrollment or profiling or learning phase performed at manufacturing). A manufacturer for example can enroll the PUF in a chip during personalization phases, in order to know the mask which will be generated, and keep the (secret) information in a database. This information may be later used if the manufacturer does want to disable its own system at low cost. Quotation of the attack of such a circuit remains high for other attackers as they need to attack the associated PUF system before attacking the cipher.

In an embodiment, the initial mask may be provided by a server external to the system. In some embodiments, the initial mask can be hardcoded at some place in the hardware, accessible to the circuit. In some embodiments, it may be provided by a server or an external memory.

In an embodiment, the system may further comprise a Central Processing Unit and/or a co-processor interfaced with the cipher block and configured to determine a modified and/or round mask.

In an embodiment, the system may comprise a Central Processing Unit interfaced with the cipher block and which is configured to determine at least one mask, to mask program data. A plurality of masks can be determined from a base mask, the plurality of masks being applied to the plurality of memory units. In an embodiment, a general-purpose Central Processing Unit (CPU) of a computer can be used to determine the mask, i.e. to scramble or obfuscate or otherwise hide the data being handled in the cipher block. Advantageously, readily available processing capabilities can be leveraged to compute base masks. In an embodiment, the system may comprise a co-processor interfaced with the cipher block and configured to determine at least one mask to mask program data. In an embodiment, a co-processor i.e. a dedicated (specific purpose) processor can be interfaced with the cipher block.

Advantageously, the co-processor can be located adjacent to the cipher block in order to improve latency.

In an embodiment, the initial mask may be received from an external memory, the external memory being local, incorporated into the device or associated to it and/or remotely accessed.

In some embodiments, the initial mask can be hardcoded at some place in the hardware associated with or accessible to the system. In some embodiments, the initial mask can be provided by an external memory (e.g. Non-Volatile-Memory) that may be local or distant. In some embodiments, the initial mask can be provided or determined by a distant server (remotely accessed). In some embodiments, parts of the mask can be locally provided or determined and parts (complimentary or not) can be remotely provided.

In an embodiment, data transport of the mask can be secured. For example, an external memory can communicate with the memory associated with the cipher via an encrypted data communication bus.

The communication bus for example can comprise the combination of a standard bus combined with a bus wrapper. Advantageously, with a dual distance of d+1, a system according to the invention is robust to a probing of order d.

In an embodiment, one or more memory units can be volatile. In some embodiments, one or more volatile memory units can be flushed in response to the detection of an attack event. For example, if a threat is detected (e.g. at application or Operating System level) and/or if the cipher shall not be used anymore, the content stored in memory can be flushed (e.g. by using a dedicated mechanism, or by writing specific pattern(s) in the whole memory). In an embodiment, one or more volatile memory units may be flushed in response to the detection of an attack event. In an embodiment, one or more volatile memory units may be randomly flushed in response to the detection of an attack event. To "flush" means "freeing up" memory. Memory unit(s) can be filled with 0 (or 1, or oxA5 value), or by randomly chosen 0 and 1. Advantageously, a potential attacker would be diverted by nonsensical data (but memory would not be empty). Different triggering events may be used: for example, if a threat is detected, in order to protect content or prevent unwanted use of the cipher function, cipher function may become not functional (cipher disabled). The trigger of the memory flush step can emanate from the processor or can be received by an external entity via I/O communication ports. The memory flush can also be triggered by a specific hardware block, such as a security monitoring block gathering information from other blocks, which can detect a potential threat or effective cyber-attack and optionally further launch the erasure of memory units and/or set a dedicated flag. In some embodiments, such a corrective or proactive or preemptive action can be triggered by a software routine or program.

In an embodiment, one or more of the initial mask, a modified mask or a round mask is refreshed. In some embodiments, the initial or input mask can be given and remain static (invariant data). The modified mask and round masks evolve over time by construction. In some embodiments, the initial mask and/or the modified mask can also be "changed", i.e. "refreshed" (in whole) or "updated" (in part).

In an embodiment, the refresh rate may be configurable. The renewal of i) the initial mask and/or of ii) the modified or custom mask can be performed at predefined time intervals. Time intervals of iterations between round masks also can be controlled. The mask can be determined dynamically, for example depending on multiple parameters, which include time (i.e. time-driven) and/or which can be dependent on events (i.e. event-driven, e.g. hard/soft reboot, detection of an attack, etc.). Different trade-offs or compromises can be made, between cost of mask renewal and additional robustness. In an embodiment, the mask is renewed at predefined time intervals. Predefined time intervals comprise periodic time intervals.

In an embodiment, the optimality of the initial mask is verified prior to effective masking of data. Optimality refers to the previously discussed mathematical properties of the initial mask. For example, the "quality" of the mask can be assessed (e.g. Hamming weight). The mathematical security properties can be verified or tested. For example, masks can be constructed from Error Correcting Codes. More specifically, in an embodiment there may be two codes C and D (D being the dual code of C in the current example) and the security parameter may be the dual distance of the dual code D. This security parameter expresses the number of probed variables the attacker needs. As a consequence, the more variables are required, the more efficient is the protection against side channel attacks.

In an embodiment, the integrity of the initial mask may be verified prior to effective masking of data. Integrity refers to the fact that an optimal initial mask has not been corrupted (intercepted and modified, e.g. falsified). In some embodiments, the properties of the initial mask and/or of the modified custom mask can be verified (determined and compared with predefined properties). Such embodiments are advantageous to guarantee that masks are not weak, in order to provide the expected level of security. If masks appear to be not optimal and/or corrupted, the system is likely to have been corrupted. In some embodiments, round masks may be tested as well.

Such verifications can be performed at different moments. For example, verification can be performed before use, e.g. one time after power-up or at each customization of the initial mask. Verifications can be handled periodically, on demand, or if a threat has been detected (or a combination thereof). The mathematical verifications can be verified in software (using as example software routine or function) and/or by a dedicated hardware circuit. Verifications can also be done on the custom mask, to check that the function which derived the mask from the initial mask is not deficient or has not been tampered.

There is further disclosed a computer implemented method comprising the steps of: receiving an initial mask comprising data tables; receiving a random value; modifying the initial mask into a modified mask with the random value, the random value selecting a transformation amongst a plurality of predefined modifications applied to data tables, the predefined modifications comprising permutations; storing the masked data tables; and handling the stored masked data tables in a cipher.

The mask may be for example received in a processor. The random value may be for example received in a TRNG. The initial mask may be modified in the processor for example. Data tables may be stored in a read-write memory. Masked data tables may be handled by the cipher for example.

There is also disclosed a computer program comprising instructions for carrying out one or more steps of the method when the computer program is executed on a computer.

Further embodiments are now described for illustration purposes only.

Figure 1:
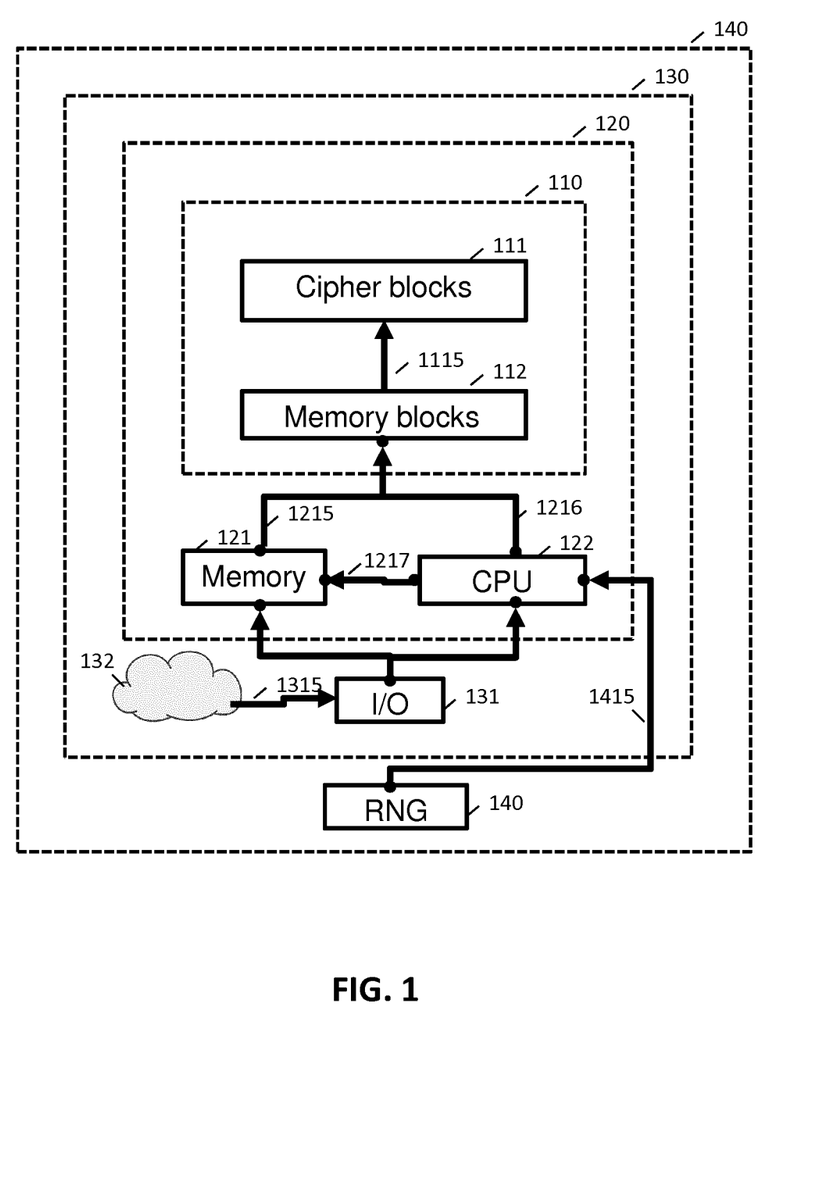
FIG. 1 is a diagrammatic view of a system comprising a cipher block, according to embodiments of the invention.

FIG. 1 is a diagrammatic view of an exemplary operating environment in which the system 10 of the invention may be implemented.

The system 10 may comprise a first group of blocks 110 comprising one or more memory blocks or units or circuits 112 which may be accessed 1115 by one or more cipher blocks or units or circuits 111. As used herein, the term "access" means that the contents of the one or more memory blocks 112 can be retrieved or read or otherwise controlled by one or more cipher blocks 111 (pull and/or push). N memory blocks 112 may be associated with N cipher blocks 111 in different ways (one to one, one to many, many to many, all to all, etc). In an embodiment, at least one of the memory blocks 112 is non-volatile or reprogrammable (e.g. "read-write" memory). In some embodiments, the one or more memory blocks 112 may be located physically adjacent (i.e. close) to cipher blocks 111, thereby lowering adverse probing attacks and improving speed/latency. In some embodiments, one or more memory blocks 112 can be remotely accessed. In other words, while cipher blocks 111 and memory blocks 112 are preferably arranged on the same hardware circuit(s), in some alternative embodiments they can be distributed differently.

The system 10 may further comprise a second group of blocks 120 comprising one or more memory units 121 and one or more arithmetic units 122. The one or more memory units may be centralized or distributed in space. The content of the one or more memory units 121 may be dispatched or distributed or copied or moved or transferred or communicated 1215 into the memory blocks 111, when triggered by the arithmetic units 122. The arithmetic units 122 can control (upstream 1217 or downstream 1216), e.g. modify, the contents of at least one memory unit 121 before dispatching into the memory blocks 112. The memory units 121 may comprise both Read Only Memory (ROM) and Read-Write Memory (RAM), i.e. volatile and non-volatile memory.

There can be one or more cipher blocks and one or more memory units. The delimitation of the perimeters can be variable or even relatively subjective in some circuits (for example, a plurality of memory units can be gathered into one physical shared memory block e.g. with a part of said shared memory being volatile). Some embodiments of the invention are directed towards a coupling of "memory" and "cipher" (whatever the physical details).

The system 10 may further comprise a third group of blocks (130) comprising I/O means or I/O interfaces (131), for example data communication channels to feed or load or fulfill data stored in the RAM or volatile or read-write memory unit(s). These I/O interfaces 131 can be associated or linked to various data sources, via different protocols (e.g. Ethernet, Cloud Computing, USB storage, Flash storage, etc).

In some embodiments, the system 10 may further comprise a fourth group of blocks (140) comprising at least one Random Number Generator or 'RNG' (141). In an embodiment, the RNG may be a Pseudo-RNG (PRNG). According to a NIST (National Institute of Standards and Technology) definition, a PRNG uses an algorithm that produces a sequence of bits from an initial value that is determined by a seed. Because of the deterministic nature of the process, a DRBG (Deterministic Random Bit Generator) is said to produce pseudorandom bits, rather than random bits.

In one embodiment, the RNG can be a True-RNG (TRNG). In some embodiments, sequences produced by a RNG may not be the result of deterministic algorithms. In such embodiments, physical and electrical phenomenon as phase noise and memory points' meta-stability can be exploited. Such Physical RNGs are called 'True-RNG' as the bits which are generated are supposed to be totally independent, the generated sequences being thus theoretically unpredictable. In an embodiment, the hardware TRNG may comprise physical random number generator (RNG) exploiting quantum optics.

In another embodiment, the RNG can comprise both a PRNG and a TRNG. RNG may be implemented in hardware and/or in software.

Embodiments of the invention may combine two or more of the groups of blocks 120, 130, 140 with the group of blocks 110, each embodiment corresponding to a different architecture design and being associated with respective advantages.

Figure 2:
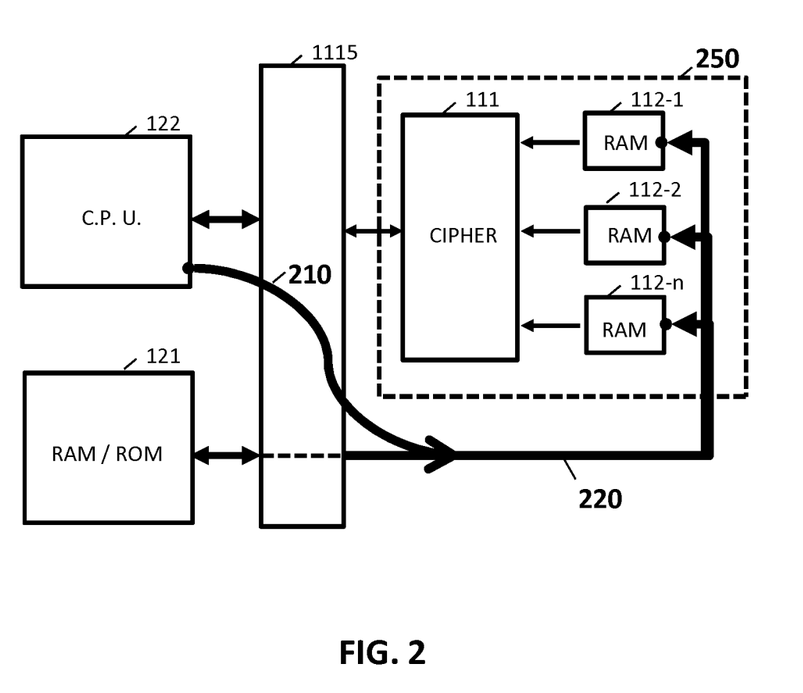
FIG. 2 illustrates a system comprising a cipher block, according to one embodiment of the invention.

FIG. 2 illustrates a particular embodiment of system 10 in which the memory content is stored in an external memory before loading into cipher RAMs.

In the embodiment of FIG. 2, the system 10 comprises a processor or C. P. U. or central processing unit 122, an "external" memory unit 121, one or more communication bus 201, an IP core 250 comprising a cipher block 111 interacting with a plurality of cipher memory blocks (112-1, 112-2, to 112-*n*). At least one of the cipher memory blocks 112 may be volatile i.e. reprogrammable. The "external" memory unit 121 can be one or more storage unit chosen among memory hierarchy. In computer storage, the term "memory hierarchy" refers to hierarchy of memory types by response time from a) internal storage, i.e. registers and cache, b) system RAM c) on-line mass storage (e.g. hard-drive) and d) off-line bulk storage.

The communication bus (201) may comprise a standard communication bus and a wrapper bus, the wrapper bus being configured to route the data unloading or data dispatching (220) of the content of the (external) memory unit (121) into the different cipher memory blocks (112-1, . . . , 112-*n*). In an embodiment, this data communication may be triggered or controlled (210) by the processor (122).

Such an embodiment presents several advantages. In particular, since RW memory units are volatile, the cipher block will be disabled after powering off. A contrario, in order to operate, the cipher block requires memory units to be loaded with contents. If a security event is detected, it can be triggered to disable the cipher block, for example by flushing the memory units (dedicated values can be written in memory units). In other words, the contents of the memory units can be changed at will. The refresh rate can depend on various parameters (e.g. clock and heartbeat, detection of an attack, etc).

Figure 3:
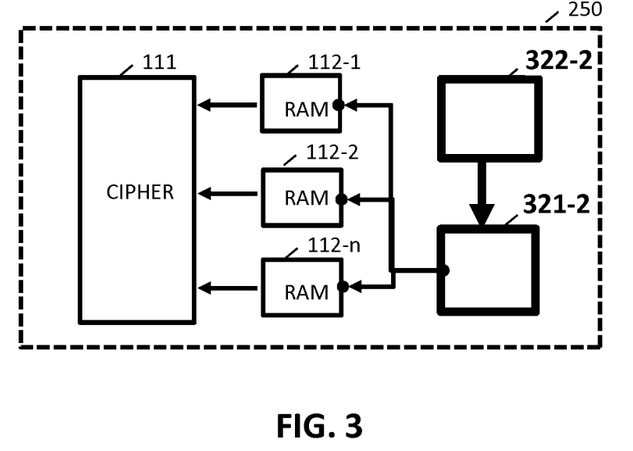
FIG. 3 illustrates a system comprising a cipher block, according to another embodiment of the invention.

FIG. 3 illustrates the system 10 according to an alternative embodiment.

The embodiment of FIG. 3 differs from the embodiment of FIG. 2 in that the Central Processing Unit 122 and the "external" memory 121 (for example the ones of a personal computer or a smartphone) are not used. These components can be "internalized" within a circuit core 250. In the embodiment of FIG. 3, the memory unit 121 is thus no longer "external": instead, the memory 321-2 is located, in this illustrative example, adjacent to the cipher block 111 and to memory units (112-1 to 112-*n*) within the circuit core 250. The memory 321-2 may be controlled by a logic 322-2 (e.g. a dedicated processing unit), dedicated to the control of the content of the memory 321-2.

Figure 4:
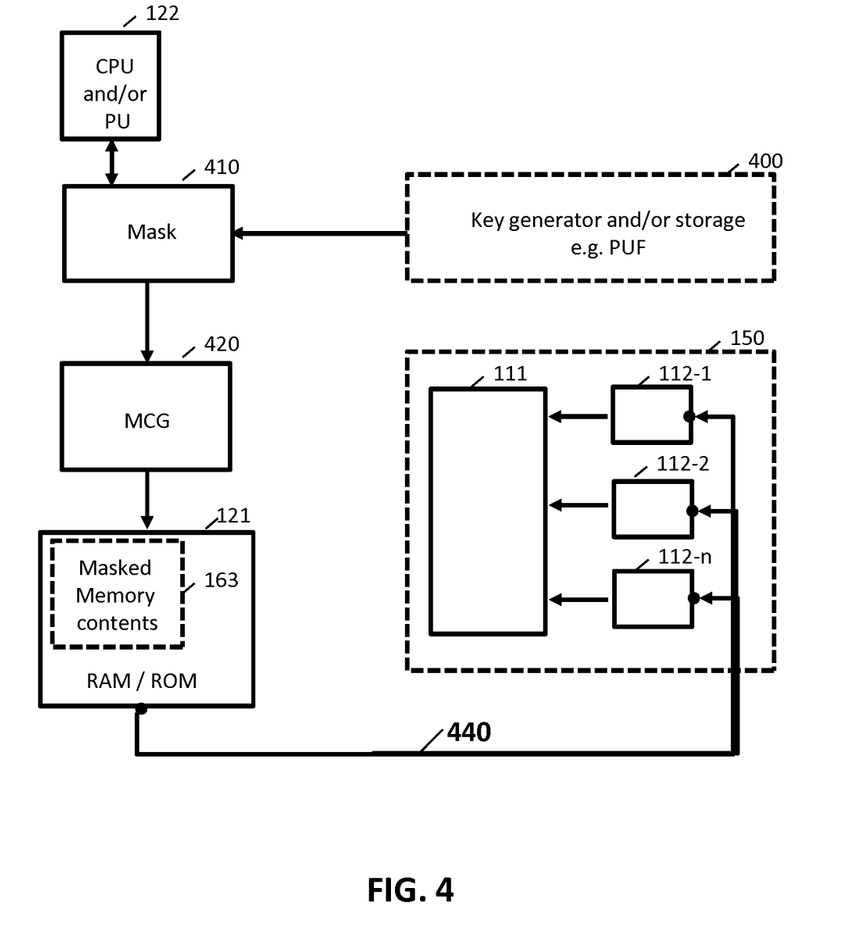
FIG. 4 illustrates an embodiment using data masking.

FIG. 4 illustrates an embodiment of system 10 using data masking. Combined with the use of volatile memory units, such embodiment is advantageously more robust to attacks.

The embodiment of FIG. 4 differs from the embodiments of FIGS. 2 and 3 in that the system further includes a key generator and/or storage circuit 400, a base mask 410, a memory content generator (MCG) or translator 122 and masked memory contents 430.

The key generator and/or storage circuit 400 are configured to store one or more keys from which a base mask 410 can be derived, for example by a general purpose central processing unit and/or by dedicated specific processing unit 122.

The base mask 410 may be then accepted as an input provided to a memory content generator (MCG) or translator 122. As an input, the MCG may receive or determine a base mask 410. As an output, the MCG may output "contents" of memory units, which are designed to be manipulated by the cipher.

An exemplary method for generating cipher memories content, for AES with an RSM countermeasure with 16 Substitution boxes, can include for example the steps consisting in:
a) obtaining sixteen random bytes m0-15 are randomly chosen once and for all (input of MCG);
b) verifying that the mathematical properties are respected and/or enables a sufficient level of security;
c) updating input (if needed);
d) configuring (or designing) the 16 rotating S-Boxes'0-15 (x'), x' being an 8-bit masked data to verify:

$$S'j(x')=S(mj\oplus x')\oplus mj+1 (\text{mod } 16), \text{ with } j\in\{0\text{-}15\} \quad \text{(Equation 1)}$$

e) the content of the memory units being then ready, in order to establish the correspondence between the memory units and the cipher, the cipher can take into account the new "organization" of data in memory. At each round of the AES algorithm, step e) may comprise rotating the S-Boxes by one position in direction D, in order to successively compute all 16 possible SB'j such that:

$$SB'j=SB(Mj\oplus X')\oplus Mj+1(\text{mod } 16), \forall j\in\{0\text{-}15\} \quad \text{(Equation 2)}$$

Advantageously, in some embodiments, the software code for generating cipher memories content can be securely updated (as being software and not hardware).

Masked memory contents 430 may be stored in the RAM/ROM 121 and later distributed or loaded 440 into the cipher RAMs (112-1 . . . 112-*n*).

In an embodiment, the base mask 410 can be randomly chosen.

In an embodiment, the base mask 410 may comprise as many ones as zeros, enabling better resilience against side channel attacks.

Such embodiment may be insufficient in certain situations as for example leaks may exist in SPA. To improve the masking, the method may further comprise selecting mask bytes in a specific subset of space [0:255], thereby reducing the signal-to-noise rate.

In an embodiment, a mask 410 may be constant. In an embodiment, one or more masks may be "engraved" in the hardware (e.g. at a specific location on/in the silicon). In such embodiment, masks may be invariant. A selection for example can be performed among static predefined masks.

In another embodiment, a mask 410 can be configurable and/or variable.

In an embodiment, a mask may be stored in an external memory (not shown). The content for cipher memories can also be stored in external memory, this data having been statically generated from the mask. For example, the content of the external memory may be retrieved and loaded onto cipher memories. Then the mask may be retrieved from external memories and also loaded into the cipher (or in a dedicated cipher memory). At the boot or only when cipher operation is needed, memory contents are then loaded onto cipher memory blocks. Advantageously, the content for cipher memories can be stored outside the circuit, meaning that memory contents can be updated after manufacturing, which may be an advantage on security in some contexts. Volatility of memory units allow data refresh, upgrade and flushing.

In an embodiment, a mask 410 can be received, e.g. via I/O interfaces (not shown).

In an embodiment, one or more masks 410 can be determined. Each mask may be associated with a score (predefined or calculated). A selection among the masks can be performed, thereby enabling selection of a level of security. For example, if and when a specific mask has been selected, the corresponding masking can be disabled and the content of associated cipher memory units can be "unmasked".

In some embodiments, a plurality of masks 410 can be determined over time: "customization" (selection of mask) can be applied several times, based on predefined events or on regular bases (each boot, periodically, when alarms are raised, etc).

In some embodiments, the determination of a mask 410 can be performed in hardware, algorithms steps embodied in silicon thus being generally faster than software embodiments. Latency can thus be reduced (e.g. cipher block can be used sooner or changed more often). If the latency is reduced, the time interval to select a mask can be reduced as well.

Figure 5:
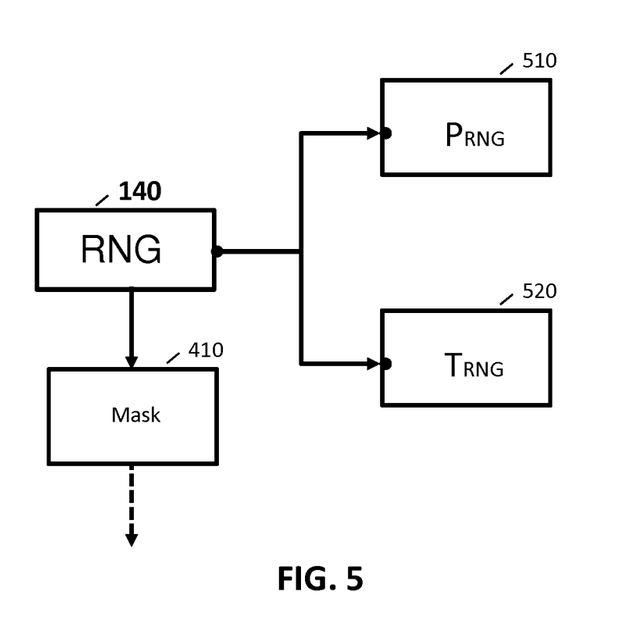
FIG. 5 illustrates embodiments of the invention, using a base mask determined with a True-Random Number Generator (TRNG)

FIG. 5 is a partial view of system 10 showing the blocks for determination of a base mask 410 using a True Random Number Generator (TRNG), according to some embodiments.

Embodiments of the invention can use different RNG 140 systems and methods (Pseudo RNG 510 and/or True RNG 520).

In an embodiment, the TRNG block 520 generates one or more random values. A random value is used to determine a base mask 410, which scrambles and/or obfuscates and/or protects the contents of the memory. A random value generally corresponds to a small amount of data (e.g. 128 bits).

The "refresh" of the mask 410, hence of the random value can also occur on a regular basis or depending on a qualified/quantified context.

In an embodiment, the renewal of the generation of the random value is depending on typical time ranges needed for an attack. For example, knowing that about 15000 ciphering cycles are required to attack AES, corresponding to 100 000 CPU cycles, the random value can be generated each second.

The mask "customization" can thus be "dynamic" (e.g. on demand, or at boot, or periodically, or intermittently, or opportunistically, or depending on one or more conditions such as for example in response to the detection of a threat or an attack, etc.).

In an embodiment, the dynamic generation of RAM content may be performed during the boot sequence. In an embodiment, the dynamic generation of RAM content may be performed on demand, or for each block of data. In an embodiment, the dynamic generation of RAM content is performed periodically.

In an embodiment, the memory units 122 and/or memory blocks 112-1, . . . ,112-n can be "flushed" (freed-up, i.e. written with 0 or 1 values, or even random values). The flush can occur on a regular basis (e.g. every X clock cycles) and/or can be triggered by a security exception (e.g. detection of an attack, probing or imaging attempt).

At the chip start-up, the cipher block is not functional, as the RAMs are empty. As the RAM content changes, the consumption profile may change (e.g. from a boot to another, from a chip to another, from a time to another). The task of the attacker is considerably hardened, and the cost of the attack increases. If the chip detects a threat, it can for example deactivate the cipher block by flushing the RAMs and/or set a flag, and/or send a message.

According to the invention, ROMs cannot be used to contain masked table of values, while RAMs can be used instead. An additional circuit block is not even required (software embodiments can enable to produce masked tables of values from an initial mask). At boot, RAMs are empty, thus the cipher function cannot operate. After boot, a first customization may be needed to get a functional cipher function.

In an embodiment, the memory contents can be stored in an external memory, and can be loaded in cipher memory units (e.g. RAMs). At the development stage, a countermeasure can be selected and a base mask 410 can be selected. Such a base mask 410 can present both random and mathematical properties. A base mask for each chip sample can be selected (e.g. customization offline step). Contents of RAMs can be derived from this base mask 410. At the factory, the contents of RAMs can be stored in external memory units. After deployment, at start-up, cipher RAMs are empty and the cipher does not work. The boot sequence can read RAM content in external memory and load it in cipher RAMs.

In an embodiment, the base mask 410 may be stored in an external memory. At the development stage, the countermeasure may be selected and a base mask 410, presenting random and mathematical properties, may be selected. A base mask 410, unique for each chip sample may be selected. This requires an offline customization. At the factory, the base mask 410 may be stored into external memory. After deployment, at start-up, cipher RAMs are empty and the cipher cannot operate. The boot sequence may read the base mask 410 from external memory. A software routine may take the base mask 410 as input and derive the RAM content. The software may load the generated content into the RAMs.

In still another embodiment, the base mask 410 may be stored in external memory, and may be provided to hardware content generator. At the development stage, the countermeasure may be selected and a base mask 410 may be selected. This base mask may have random and mathematical properties. A base mask 410 for each chip sample can be selected. At the factory, the content of RAMs may be stored into external memory. After deployment, at start-up, cipher RAMs are empty and the cipher function cannot be used. The boot sequence may read the base mask 410 from external memory. The base mask may be provided to a dedicated hardware module, which determines memory contents and load them into the RAMs.

In another embodiment, the base mask 410 may be built from a random value. Memory content may be generated by hardware or software. After deployment, at start-up, ciphers' RAMs are empty, and the cipher function does not work. The software gets a random data from a TRNG. The software or the dedicated hardware may process the random data to generate a base mask 410 with required mathematical properties. The software or the dedicated hardware may get the generated base mask 410 and derive the RAM content. The software or the dedicated hardware may load the generated content into the RAMs.

The disclosed methods can take form of an entirely hardware embodiment, an entirely software embodiment or an embodiment containing both hardware and software elements. An entirely hardware embodiment is advantageous in terms of performance and power consumption. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

Figure 6:
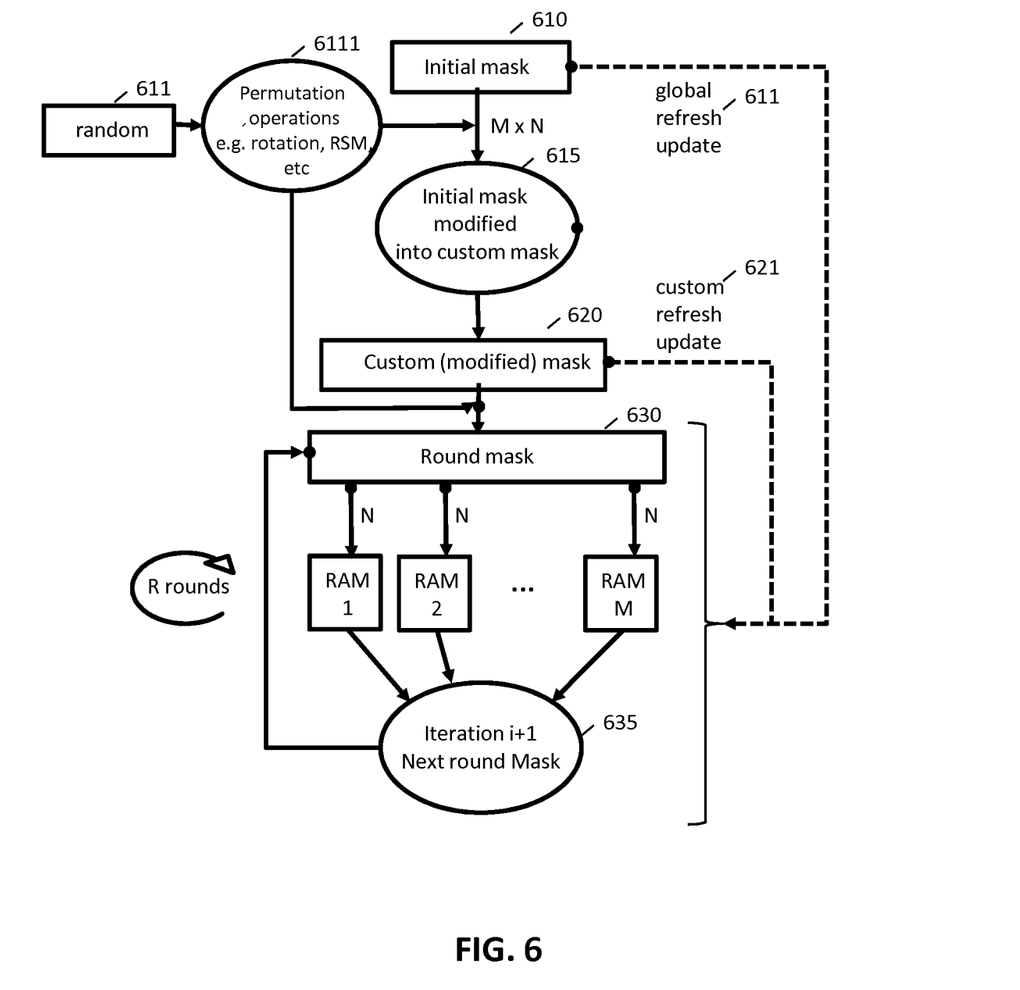
FIG. 6 is a flowchart of a method, according to an embodiment of the invention.

FIG. 6 is a flowchart depicting a method, according to an embodiment of the invention.

At step 610, an initial mask is received (e.g. provided, computed, determined, assembled, etc), locally and/or from remotely accessed resources (e.g. servers, etc).

At step 615, the initial mask is modified into a modified mask 620 ("custom mask").

The modification of the initial mask may be performed in a constrained way. The custom mask may belong to an equivalent code of C.

To configure the modifications (e.g. permutations), the constants which can be used to modify the initial mask can be random 611 (for example provided by a TRNG), the random constant being used to select one or more of modifications or transformations 6111 to be applied to the mask.

For example, the modifications 6111 applied to the initial mask can comprise one or more of the following operations:

the custom mask can be obtained by rotating the initial mask with an offset whose value is between 0 and the code cardinality;

bytes of the code-word of the initial mask can be permuted (for example 8! Bytes permutation);

bytes can be rotated (RSM approach);

bytes can be XORed by a constant (e.g. with a same constant for every Byte).

The skilled person will readily understand that other types of modification(s) can be applied alternatively.

At step 630, the modified mask may be applied, as a first round mask, to mask program data: data tables (manipulated by the cipher block), for example coded over N=8 bits may be loaded into the M memory units (RAM units labeled 1 to M). The contents of the memory units may be manipulated by the cipher block(s), which outputs a second/next round mask 635. For example, between rounds, an offset can be incremented by a number coprime with the code cardinality (RSM corresponds to +1).

A (configurable) number R of iterations/rounds can be performed.

Two distinct events/triggers can intervene and control the above steps.

The "custom" mask (the modified mask from the initial mask) can be modified at step 621 "custom refresh/update", e.g. refreshed, or updated, or corrected.

The initial mask (block 610) can be modified at step 621, consisting in applying a "global refresh/update". Accordingly, the initial mask can be refreshed, or updated, or corrected.

In some embodiments, steps 611 and 621 may be independent. In some embodiments, steps 611 and 621 can be dependent. For example, a global refresh can be required after a number of custom refreshes defined by a threshold. A custom refresh can be tested and may cause a global refresh. Various tests can be used (independent tests, random tests, partial tests, external tests, etc).

As an output of the different masks previously described, data tables are handled by the cipher.

In another embodiment, the method may comprise a first step consisting in randomly selecting a mask; in a second step, the codeword may be further corrected to meet expected mathematical properties; in a third step, masking tables may be computed (for example to determine bytes' substitutions); in a fourth step, masked data may be loaded into memory units. During the fourth step, as memory units are being loaded, one or more cipher blocks will not be functional, which can cause delays. Double-port memory units can advantageously be used (a memory unit can thus comprise two data tables, for simultaneous writing and reading operations, along with a switching mechanism). Such an embodiment allows customizing the processing on demand, while avoiding delaying data processing.

In an embodiment, the cipher may comprise a field-programmable gate array circuit. A field-programmable gate array (FPGA) is an integrated circuit designed to be configured by a customer or a designer after manufacturing. Such FPGA based implementation may be advantageously faster.

The invention claimed is:

1. A system, comprising one or more memory units, and a circuit, comprising a cipher block, said cipher block accessing said one or more memory units, wherein:
    said cipher block is configured to handle data tables;
    said memory units are configured to store said data tables;
    said memory units are read-write memory units;
    said data tables are obtained from a modified mask; and
    said modified mask being determined by modifying an initial mask using a random value, the random value selecting one or more modifications applied to the initial mask amongst a plurality of predefined modifications including permutation operations,
    wherein the initial mask is a mathematically optimal mask selected among a code C and a dual code D of code C, wherein C is a constant hamming weight code and wherein D is a code with a large dual distance, the large dual distance of the dual code D forming a security parameter which expresses a number of probed variables that an attacker needs.

2. The system of claim 1, wherein the modified mask is a codeword of a code equivalent to the self-dual code of constant hamming weight.

3. The system of claim 1, wherein predefined modifications or permutation operations comprise offset shifting and/or rotation and/or XOR operations.

4. The system of claim 1, further configured to modify the modified mask determined from the initial mask into a round mask.

5. The system of claim 4, wherein a round mask is determined from permutation operations comprising rotation and/or coprime construction.

6. The system of claim 1, wherein the random value is provided by a Pseudo Random Number Generator circuit and/or a True Random Number Generator circuit.

7. The system of claim 1, wherein the random value is provided by a Physically Unclonable Function.

8. The system of claim 1, wherein the initial mask is provided by a server external to said system and/or by an external memory, said external memory being local and/or remotely accessed.

9. The system of claim 1, wherein the memory is a volatile memory.

10. The system of claim 1, wherein one or more of the initial mask, a modified mask or a round mask is refreshed.

11. The system of claim 10, wherein a refresh rate is configurable.

12. The system of claim 1, wherein the optimality and/or an integrity of the initial mask is verified prior to effective masking of data.

13. The system of claim 1, wherein said memory units comprise double-port memory units, a memory-unit comprising two data tables for simultaneous writing and reading operations, along with a switching mechanism.

14. The system of claim 1, wherein the one or more memory units are located physically adjacent to the cipher block.

15. A computer implemented method, comprising the steps of:

receiving an initial mask and data tables, said data tables being stored in memory units, said memory units being read-write memory units;

receiving a random value;

modifying the initial mask into a modified mask using said random value, the random value selecting one or more modifications applied to the initial mask amongst a plurality of predefined modifications comprising permutation operations;

obtaining masked data tables from the modified mask and the received data tables;

storing said masked data tables; and handling said stored masked data tables in a cipher, wherein the initial mask is a mathematically optimal mask, selected among a code C and a dual code D of code C, wherein C is a constant hamming weight code and wherein D is a code with a large dual distance, the large dual distance of the dual code D forming a security parameter which expresses a number of probed variables that an attacker needs.

16. A computer program comprising instructions for carrying out the steps of the method according to claim 15 when said computer program is executed on a computer.

* * * * *